United States Patent
Smith

(10) Patent No.: US 11,485,893 B2
(45) Date of Patent: Nov. 1, 2022

(54) HEAVY FLUID AND METHOD OF MAKING IT

(71) Applicant: Highland Fluid Technology, Inc., Houston, TX (US)

(72) Inventor: Kevin W. Smith, Bellaire, TX (US)

(73) Assignee: Highland Fluid Technology, Inc., Houston, TX (US)

( * ) Notice: Subject to any disclaimer, the term of this patent is extended or adjusted under 35 U.S.C. 154(b) by 217 days.

(21) Appl. No.: 17/077,367

(22) Filed: Oct. 22, 2020

(65) Prior Publication Data
US 2021/0079283 A1    Mar. 18, 2021

Related U.S. Application Data

(62) Division of application No. 16/178,965, filed on Nov. 2, 2018, now abandoned.

(60) Provisional application No. 62/580,813, filed on Nov. 2, 2017.

(51) Int. Cl.
| | |
|---|---|
| C09K 8/06 | (2006.01) |
| C09K 8/84 | (2006.01) |
| C09K 8/86 | (2006.01) |
| C09K 8/12 | (2006.01) |
| C09K 8/88 | (2006.01) |

(52) U.S. Cl.
CPC ............... *C09K 8/06* (2013.01); *C09K 8/12* (2013.01); *C09K 8/845* (2013.01); *C09K 8/86* (2013.01); *C09K 8/88* (2013.01); *C09K 2208/22* (2013.01); *C09K 2208/32* (2013.01)

(58) Field of Classification Search
CPC .. C09K 2208/22; C09K 2208/32; C09K 8/06; C09K 8/12; C09K 8/845; C09K 8/86; C09K 8/88
See application file for complete search history.

(56) References Cited

U.S. PATENT DOCUMENTS

| | | | |
|---|---|---|---|
| 2,143,008 A | 1/1939 | Heath et al. | |
| 3,367,416 A | 2/1968 | Ralston et al. | |
| 4,566,976 A | 1/1986 | House et al. | |
| 5,733,841 A | 3/1998 | Thomas | |
| 7,196,221 B2 | 3/2007 | Abbott et al. | |
| 9,868,890 B2 | 1/2018 | Alleman | |
| 2003/0075331 A1 | 4/2003 | Kippie et al. | |
| 2003/0130133 A1 | 7/2003 | Vollmer | |
| 2003/0173087 A1 | 9/2003 | Kirk | |
| 2003/0220202 A1 | 11/2003 | Foxenberg et al. | |
| 2017/0260478 A1 | 9/2017 | Sutton, Jr. et al. | |
| 2017/0292055 A1* | 10/2017 | Alleman ................ | C09K 8/52 |

FOREIGN PATENT DOCUMENTS

WO      2016094231 A1    6/2016

OTHER PUBLICATIONS

Smith, E. et al., "Deep Eutectic Solvents (DESs) and Their Applications", Chemical Reviews 114, 2014, 11060-11082, American Chemical Society.

Naser, J. et al., "Potassium Carbonate as a Salt for Deep Eutectic Solvents"; International Journal of Chemical Engineering and Applications vol. 4, No. 3, 2013, 114-118.

* cited by examiner

*Primary Examiner* — Frances Tischler
(74) *Attorney, Agent, or Firm* — Vorys, Sater, Seymour and Pease LLP; William L. Krayer

(57) ABSTRACT

Heavy fluids are made from calcium bromide and at least one hydrogen bond donor such as a low molecular weight polyol or an organic acid. The combination of a hydrogen bond donor and calcium bromide as a hydrogen bond acceptor in an appropriate molar ratio forms a higher density clear completion fluid at a low temperature not otherwise obtainable with heavy aqueous solutions of calcium bromide such as are used in oilfield wells. A method of making the fluid comprises mixing calcium bromide with the polyol(s) in the presence of water and then reducing the water content, thus forming a heavy fluid. A crystallization inhibitor such as nitrilotriacetamide or a particulate silicate is included in the formulation. When the heavy fluid "freezes," its physical form is somewhat amorphous and pumpable rather than crystalline. The heavy fluid is useful as a drilling fluid as well as a completion fluid and for other purposes in oil recovery processes where extreme density is beneficial.

15 Claims, No Drawings

HEAVY FLUID AND METHOD OF MAKING IT

RELATED APPLICATION

This application is a division of U.S. application Ser. No. 16/178,965 filed Nov. 2, 2018, which claims the full benefit of Provisional Application 62/580,813 filed Nov. 2, 2017. Each of the above applications is incorporated herein by reference.

TECHNICAL FIELD

Heavy fluids are made from calcium bromide and at least one low molecular weight polyol which acts as a hydrogen bond donor. The combination of a hydrogen bond donor and calcium bromide as a hydrogen bond acceptor in an appropriate molar ratio forms a higher density clear completion fluid at a low temperature not otherwise obtainable with heavy aqueous solutions of calcium bromide such as are used in oilfield wells. A method of making the fluid comprises mixing calcium bromide with the polyol(s) in the presence of water and then reducing the water content, thus forming a heavy fluid. When the heavy fluid "freezes," its physical form is somewhat amorphous and pumpable rather than crystalline. The heavy fluid is useful as a drilling fluid as well as a completion fluid and for other purposes in oil recovery processes.

BACKGROUND OF THE INVENTION

It is desirable for a clear completion fluid used in oil well processing to have a high density in order to impose a high hydrostatic pressure on the well and counteract formation pressure. Aqueous calcium bromide solutions are commonly used because of their weight, but simply increasing the concentration of $CaBr_2$ to obtain more weight elevates the crystallization point—the temperature at which a solid is formed, rendering the material unpumpable, thus frustrating the fluid's usefulness.

Zinc bromide can be mixed with calcium bromide to yield higher density, but zinc bromide is a marine pollutant and highly corrosive. Fluids containing zinc bromide are highly corrosive both to skin and to metal. There is a compelling need to replace zinc bromide both for HSE (health, safety and environmental) reasons and to mitigate downhole corrosion. By comparison, calcium bromide that does not contain zinc bromide has a good HSE profile and low corrosion rates. But the fluid must have the properties needed for the work to be done.

In offshore wells, particularly in deep water, a completion fluid is likely to be exposed to temperatures in the range of 30° to 40° F. for extended periods of time at the mud line; thus a True Crystallization Temperature (TCT) in the completion fluid higher than 30 degrees F. is not useful in that situation. Also, pressure can increase the TCT, compounding the need for a fluid with a low built-in TCT.

In the past, well engineers have focused on the weight concentration of calcium bromide in water when designing a completion fluid. That is, for example, a 54.2% by weight $CaBr_2$ solution in water has a TCT of −1° F. but weighs only 14.2 pounds per gallon. Increasing the concentration of $CaBr_2$ to make a 14.6 ppg solution elevates the TCT to 30° F., and increasing the weight (density) further by simply adding more $CaBr_2$ to obtain a 15.3 ppg solution will elevate the TCT to 68° F., which is useless in many wells, especially deep offshore wells. Elevated concentrations of calcium bromide in aqueous solution are not the answer. A desirable practical goal is a density in the range of 15.0-15.5 pounds per gallon, as it could still be handled (with appropriate precautions) and its performance is greatly enhanced by the increased density, if its TCT can be controlled.

There is a need for a clear completion fluid which is very dense, free of zinc bromide, and also has a low crystallization temperature or is still pumpable when crystals form in the fluid.

As further background for the description of the invention to follow, it is of interest to remember that while pure ethylene glycol will "freeze" at about 11 or 12 degrees Fahrenheit, a 60%/40% by weight mixture of ethylene glycol and water freezes at about −49° F.; the 60/40 mixture achieves the lowest freeze point of all ratios of the two materials. Similarly, as the ratio of glycerol to water is increased from 0/100% to 100%/0, the freeze point follows a curve from 0° C. to about −46° C., at a ratio of about 66% glycerol to 34% water by weight, then increases on a substantially straight line as the ratio of glycerol to water is increased, to the undiluted glycerol freeze point of about 17.6° C.

SUMMARY OF THE INVENTION

My invention includes a fluid having two basic components: calcium bromide and a hydrogen donor such as an organic acid or a low molecular weight polyol. While I do not intend to be bound by any theories, I believe that, because of the way the composition is made, a portion of each ingredient is combined with some of the other to form a composition including a nonsymmetric ion which is not present in a simple mixture or solution. The formation of the nonsymmetric ion takes place by hydrogen bonding—that is, the polyol acts as a hydrogen bond donor and the calcium bromide is a hydrogen bond acceptor. In order to achieve this, water must be removed after the mixture is made. Where substantially all the free water is removed from the mixture, any water remaining appears to be bound to the calcium bromide. The invention includes a method of making the fluid, and the use of the fluid as a drilling fluid or as a clear completion fluid in hydrocarbon recovery.

The novel fluid includes, in addition, a small amount of nitrilotriacetamide ("NTA"), which acts as a crystallization inhibitor; it is added at a specified point in the fluid's preparation, which is explained further below. Alternative crystallization inhibitors such as functionalized or other fine particle silica, may be added after the hydrogen bonding is accomplished. The new dense fluid may also be used as a drilling fluid. The likely formation of the nonsymmetric ion may be part of the novel method.

I am able to incorporate a high percentage of calcium bromide in my fluid by eliminating or minimizing the use of water as a solvent or carrier (although some may be added later for other reasons) as a vehicle for introducing the $CaBr_2$ to the composition. In one method of making my heavy fluid, water may be used first to dissolve the calcium bromide so that it can be intimately mixed with the hydrogen donor. A readily understood example, and a quite useful and practical one, is the combination of $CaBr_2$ and ethylene glycol (EG), $OHCH_2CH_2OH$. After the $CaBr_2$ is dissolved in water, the ethylene glycol is mixed with the solution in a molar ratio of $CaBr_2$ to EG of 1:1. A small amount (typically 0.5% to 2.0%, based on the total non-water ingredients) of NTA is added in aqueous solution. Water is then removed in any suitable manner, such as evaporation, leaving a fluid having a density of about 16 pounds per gallon and a modified freeze point of about 40° F. The fluid appears to include a nonsymmertic ion made by hydrogen acting as a hydrogen bond from the hydroxyl groups of the ethylene glycol.

Evaporation, as a practical matter, requires the introduction of heat, but I may generate a portion of the heat by dissolving dry calcium bromide into a mixture of water and at least one polyol. Dissolution of calcium bromide in water is notably exothermic. Thus, in this mode of preparation, a calcium bromide solution need not be made as an initial step. As a further essential step of my process, after dry $CaBr_2$ is dissolved in the mixture of water and polyol, a desired amount of water is removed to increase the density of the mixture to at least 16 pounds per gallon, preferably at least 15 pounds per gallon.

The term "deep eutectic solvent" is used in an article by Emma L. Smith, Andrew P. Abbott, and Karl S. Ryder titled *Deep Eutectic Solvents (DESs) and their Applications*. See FIG. 2, a "schematic representation of a eutectic point on a two component phase diagram." The authors note that "(t)he difference in the freezing point at the eutectic composition of a binary mixture of A+B compared to that of a theoretical ideal mixture" is "related to the magnitude of the interaction between A and B." The schematic shows a significant (deep) trough below a line drawn between the melting points of the two components. The authors also say (p. 11060-11061) that deep eutectic solvents "contain large nonsymmetric ions that have low lattice energy and hence low melting points. The charge delocalization occurring through hydrogen bonding between for example a halide ion and the hydrogen-donor moiety is responsible for the decrease in the melting point of the mixture relative to the melting points of the individual components."

The deep eutectic solvents are said to be analogous to ionic liquids and are grouped into four classes in the above article and elsewhere in the literature. Previous work with deep eutectic solvents does not, however, include the development of heavy fluids useful in oilfield applications. Nor does it include the development of heavy fluids containing such nonsymmetric ions in a significantly water-reduced or water-deprived state. Nor does it include my method of creating heavy fluids that are pumpable even after reaching a low crystallization temperature. While I believe nonsymmetric ions are present in all of my compositions, it will be observed that they do not necessarily meet the definition of a eutectic, in that the crystallization point of the finished composition may be well above the crystallization point of the hydrogen donor.

My chief objective is to obtain a heavy fluid, free of zinc, having a crystallization point well below that of previously known solutions of the heavy salts used to make heavy brines and other heavy fluids used in oil well processing.

My preferred polyol is ethylene glycol. Instead of, or together with ethylene glycol, propylene glycol or glycerol can be used as the hydrogen donor. In the case of glycerol, the molar ratios are adjusted accordingly. That is, since glycerol $HOCH_2CHOHCH_2OH$ has three (hydrogen donor) hydroxyl groups, the ideal molar ratio of $CaBr_2$ to glycerol would be 3:2. In practice, the ratio may be varied from 5:2 to 2:5. A mixture of at least two polyols selected from ethylene glycol, propylene glycol and glycerin, each of said polyols comprising at least 10% by weight of the mixture, can be used also, the particular ratios dependent on the desired viscosity, density, cost or other properties.

Particular mixtures of polyols may also be chosen to take advantage of the deep eutectic freezing points such mixtures exhibit. The polyol mixtures continue to act as hydrogen donors in the presence of calcium bromide; thus, my invention includes the use of mixtures of ethylene glycol, propylene glycol (1,2 propane diol; PG), and glycerol (GLRL) in combination of any two or all three wherein each is present in an amount of at least 10% by weight. Examples of such ratios are listed in List A. The invention is most efficient in hydrogen bonding to form the above-described nonsymmetric ions when care is taken to observe the molar equivalence of hydroxyl groups to bromide moieties in the composition.

| List A: Useful Hydrogen Donor (Polyol) Mixtures (by weight) | |
|---|---|
| 1. 1 GLRL: 9 EG | 2. 1 GLRL: 4 EG |
| 3. 1 PG: 9 EG | 4. 1 PG: 4 EG |
| 5. 1 GLRL: 3 EG | 6. 1 PG: 3 EG |

Since glycerol and propylene glycol both contain three carbon atoms, the general formula $OHCH_2CH(OH)CH_2X$, where X is H or OH, may be useful to describe the hydrogen donor combinations recited in List A. Thus the ranges of list A may be summarized:

1 $OHCH_2CH(OH)CH_2X$, where X is H or OH: 3-9 EG

Likewise, combinations of ethylene glycol (EG) and low molecular weight polyethylene glycol (having 4-8 carbon atoms and 3 to 8 hydroxyl groups—PEG) in mixtures of EG containing 1% to 25% PEG may be useful where a somewhat higher viscosity is desired. As with the combinations of EG and PG or GLRL mentioned above, the bromide should be in a range of near equivalence to the hydroxyl moieties, e.g. is a range of 2:5 to 5:2 or preferably 3:4 to 4:5.

Other useful examples of hydrogen donors in addition to the low molecular weight polyols mentioned above include sorbitol, urea, citric acid, tartaric acid, and choline chloride. Where an increase in viscosity is not one of the desiderata, I prefer to use such relatively low molecular weight materials; they tend to be more common, available, easier to work with and easier to maintain the optimum molecular weight ratios; also many of them are known to be acceptable in oilfield processing. Where an increase in viscosity is desired as an additional benefit, higher molecular weight polyols and other polymeric materials having many hydrogen donor sites may be used, taking care to match the hydrogen donor sites to the acceptor sites on the $CaBr_2$ and also realizing that the application in mind may have an upper limit for viscosity. The practitioner should be aware that the increasing molecular weight of longer chain polyols will increase viscosity exponentially in aqueous solution; in the present context, where it is desired to have little or no water, the practical limit in molecular weight for candidate polyols is rather low. Nevertheless, as indicated above, I do not intend to rule out the use of polyols having four or more hydroxyl groups. Sorbitol is mentioned specifically below.

In choosing hydrogen donors, one should also be aware of their physical state at ambient temperatures—for example, citric acid is crystalline at room temperature; if both the $CaBr_2$ and the citric acid are in the form of separate aqueous solutions added together, more water must be removed than might otherwise be the case. Even with this example, however, the reduced-temperature crystallinity phenomenon is observable.

As indicated above, my invention includes the method of making a phase controlled clear heavy fluid comprising mixing a heavy hydrogen acceptor compound with a hydrogen donor compound in the presence of water and removing water in any effective manner to create at least some large nonsymmetric ions; evaporation is effective to remove the water and cause the formation of the nonsymmetric ions. The hydrogen donor compound is preferably a low molecular weight polyol. By a low molecular weight polyol, I mean ethylene glycol (EG), propylene glycol (PG), and glycerol (GLRL).

I also include a small amount of a crystallization inhibitor in my dense fluids. They are of two types—solid and dissolved. The dissolved inhibitor is preferably nitrilotriacetamide (NTA) in water. The small amount, 0.5% to 2.0% NTA, is added to the mixture before water is removed. The solid, amorphous or functionalized silica, which may be in nano size (x to y % by weight of the non-water components), may be added before or after the water is removed. By inhibiting crystal formation at lower temperatures, these materials greatly enhance the ability to pump the dense fluid when otherwise exposure to low temperatures would noticeably increase the risk that pumpability would be impossible.

The invention is further described below.

DETAILED DESCRIPTION OF THE INVENTION

Several different general methods of making my low-freezing heavy fluid will be described below. This degree of stability appears to be due to the formation of a nonsymmetrical ion by the action of the hydrogen bond donor on the hydrogen bond acceptor.

Procedure 1

As indicated above, $CaBr_2$ and ethylene glycol may be used to make my new fluid. In order to achieve a good mix with the hydrogen donor (EG), calcium bromide is first dissolved in water, then ethylene glycol is mixed with the solution in a molar ratio of $CaBr_2$ to EG of 1:1. To minimize heat expenditure in the evaporation step, the calcium bromide solution is beneficially a saturated solution. Deviation from the 1:1 ratio, say within the range 2:5 to 5:2, may be effective as a practical matter. Water is then removed in any suitable manner, such as evaporation, to achieve a fluid having a density of 16.5 pounds per gallon. The fluid will have a crystallization point of about 40° F., which contrasts with the crystallization point higher than ambient temperature which one would expect for an aqueous solution of 16.5 CaBr2.

Since it is a part of my method to remove water from the mixture, I prefer to avoid using excess water with the $CaBr_2$. A saturated or near saturated solution is preferred, but excess water will not prevent the accomplishment of the goal, which is to obtain a clear liquid including as little water as possible and that includes a significant quantity of nonsymmetric ions; these ions survive the evaporation of the water of solvation of the $CaBr_2$. Moreover, they appear to survive the re-introduction of water to the fluid. If, for example, the above attained fluid having a density of 16.0 or 16.5 ppg is considered too dense for the particular use at hand, it is notable that the addition of a small amount of water (or other solvent) to reduce density does not seem to affect the nonsymmetric ion relationship.

Evaporation of the water may be accomplished by heating the mixture. Any way of heating may be used. Mixing may continue during heating and evaporating.

Procedure 2

A method of preparation similar to Example 1 substitutes glycerol for ethylene glycol and incorporates calcium bromide in a molar ratio of 3 $CaBr_2$ to 2 glycerol. Evaporating the water originally in the calcium bromide brine will result in a slightly heavier material than was obtained using ethylene glycol.

The calcium bromide used to make the $CaBr_2$ solution for mixing with the polyol hydrogen bond donor may initially be either in the hydrated or anhydride form. There are several different calcium bromide hydrates mentioned in the literature. The authors of the above-mentioned paper on deep eutectic solvents say that the solid metal halide hydrates have lower melting points than the corresponding anhydride salts. After removal of the water in my method, however, the calcium bromide molecular structure, or at least some of it, is altered by the formation of nonsymmetric ions including both bromide and hydrogen components, and, although the entire mixture may be substantially "anhydrous," the conventional understanding of an anhydrous molecular structure is not applicable—a nonsymmetric ion exists in a substantially water-free or reduced water system. Particularly when solidification occurs at lower temperatures, true crystals are not formed; the material is "soft" or amorphous and actually pumpable at the solidification temperature and below.

Procedure 3

To enhance the pumpability of the "frozen" eutectic material, I may add a small amount of a crystallization inhibitor such as nitrilotriacetamide (0.5-2.0% based on the non-water components), amorphous silica, functionalized silica, or any other acceptable crystallization inhibitor. To assure even distribution of the crystallization inhibitor, it can be present at the beginning of the process so that it can be thoroughly mixed into the mixture before water removal is begun. The silica may be added at any time in the process of preparation of the deep eutectic fluid.

Procedure 4

An especially useful and practical approach is to (a) prepare an aqueous solution of calcium bromide having a density of 14.2 pounds per gallon (b) add 10 percent, based on the weight of the $CaBr_2$ solution, propylene glycol (ethylene glycol, glycerol, or mixtures of the three polyols may be substituted), and then (c) remove twenty percent, based on the weight of the whole solution, water, concentrating the solution by removing 20% of it in the form of water will result in a clear fluid having a density of 15.2 pounds per gallon, which is a highly desirable density for many oilfield uses. Its low crystallization temperature has been unattainable in the past for a fluid of such a density. The clear, solids-free fluid composition may be used as a completion fluid, drilling fluid, or for gravel packing.

For use in the oilfield, it may be convenient to use an already-prepared solution of calcium bromide such as, for example, a 14.2 pound per gallon solution prepared off site. At the site of use, this solution can be mixed with the hydrogen bond donor, such as one or more of the low molecular weight polyols mentioned above. Water is then removed from the mixture to make the heavier composition of the invention. Useful examples of combinations of polyols include mixtures of EG with 10-15% PG or GLRL.

As my heavy fluids are contemplated for use in various oilfield and gas production applications, a notable advantage is that wherever water is mentioned throughout this description of the invention as a medium for dissolving calcium bromide or otherwise in the preparation of the heavy fluid, dilute brine may be used as a substitute for plain water. Dilute brine is commonly available in the oilfield and may present a problem for disposal which can be alleviated by use in the present invention.

Procedure 5

This procedure and Procedure 6 utilize the fact that the dissolution of calcium bromide in water generates heat. In this Procedure 5, which may be particularly useful in the field, a previously prepared 14.2 pound per gallon solution of calcium bromide is mixed with the polyol and then more calcium bromide is added in the form of a dry salt, preferably to achieve a molar ratio described above for the final composition. The dissolution of the calcium bromide will generate some heat and thereby elevate the temperature of the mixture, but will not be enough to evaporate any water. Additional heat will be required to evaporate the required amount of water, create the asymmetric ions described above, and achieve a deep eutectic heavy fluid.

Procedure 6

Yet another way is to mix the three components at the same time—water, polyol, and $CaBr_2$. This will be even more exothermic than the approach of Procedure 5, but will still require the addition of heat to achieve the desired degree of water evaporation.

It should be understood that the crystallization inhibitors NTA and silica are beneficially used in any of the above procedures as explained generally above.

In addition to use as clear completion and drilling fluids, my heavy fluids may be useful in other oilfield applications such as pipeline cleanouts, coiled tubing cleanouts, to help release stuck drill pipe, and to remove refinery deposits. The unique combination of attributes of my compositions—high density, free of zinc, clear, and pumpability at very low temperatures point to their high versatility. As to density, persons skilled in the art of hydrocarbon recovery will recognize that the heavy fluids may be favored candidates for any application where barite has been used in the past. The heavy fluid compositions may include at least one additive selected from viscosity enhancing agents, corrosion inhibitors, antibacterial agents, viscosity adjusters, and hydrate inhibitors.

The invention claimed is:

1. A method of making a clear, zinc-free heavy fluid pumpable at low crystallization temperatures comprising (a) mixing (i) calcium bromide ($CaBr_2$) and 0% to 50% water by weight of the total of calcium bromide and water with (ii) at least one hydrogen donor in a mixture with up to 50% water by weight of the total of said hydrogen donor and water, (b) adding 0.5-2.0% based on the non-water components of a crystallization inhibitor to the mixture of (a)(i) and (a)(ii), and (c) removing water from said mixture to achieve a density of said mixture of at least 16 pounds per gallon.

2. The method of claim 1 wherein said at least one hydrogen donor comprises at least one polyol having from 2-6 carbon atoms and 2-6 hydroxyl groups or at least one organic acid.

3. The method of claim 1 wherein said calcium bromide in part (a)(i) is a saturated solution of calcium bromide in said water.

4. The method of claim 1 wherein said calcium bromide in part (a)(i) is solid calcium bromide.

5. The method of claim 1 wherein (1) step (a)(i) produces an aqueous solution of calcium bromide having a density of 13.9 to 14.5 pounds per gallon, (2) the mixture of part (a)(ii) comprises water and 9-11 percent of the at least one hydrogen donor, wherein the hydrogen donor is a polyol selected from ethylene glycol, propylene glycol, glycerin and mixtures thereof based on the weight of the $CaBr_2$ solution, and (3) wherein, in step (c), 18-22 percent water, based on the weight of the whole solution, is removed.

6. The method of claim 5 wherein the calcium bromide solution in produced in step (a)(i) has a density of 14.1 to 14.3 pounds per gallon.

7. The method of claim 5 wherein the mixture of part (a)(ii) comprises 9.8 to 10.2 percent ethylene glycol.

8. The method of claim 5 wherein, in step (c), 19.5 to 20.5 percent of the solution is removed as water.

9. The method of claim 5 wherein, in step (c), said water is removed by evaporation.

10. Method of making a phase controlled heavy fluid comprising (a) mixing at least one low molecular weight polyol with calcium bromide in the presence of water or dilute brine and 0.5-2.0% based on the non-water components of a crystallization inhibitor, and (b) reducing the water concentration in the mixture of step (a) to obtain a fluid having (i) a crystallization point lower than a fluid of the same proportions of the same ingredients made by mixing without removing water, and (ii) a density of at least 15 pounds per gallon.

11. The method of claim 10 wherein said crystallization point is lower than 40° F.

12. The method of claim 10 wherein said low molecular weight polyol comprises ethylene glycol.

13. The method of claim 10 wherein, step (a) comprises mixing said low molecular weight polyol with an aqueous solution of calcium bromide.

14. The method of claim 10 wherein step (a) comprises mixing in at least some of said calcium bromide as a dry salt.

15. The method of claim 1 wherein said crystallization inhibitor comprises nitrilotriacetamide.

* * * * *